April 10, 1973  A. M. REID ET AL  3,726,656
METHOD OF PRODUCING ELONGATE, CLAD GLASS MEMBER
Filed Oct. 12, 1970  2 Sheets-Sheet 1
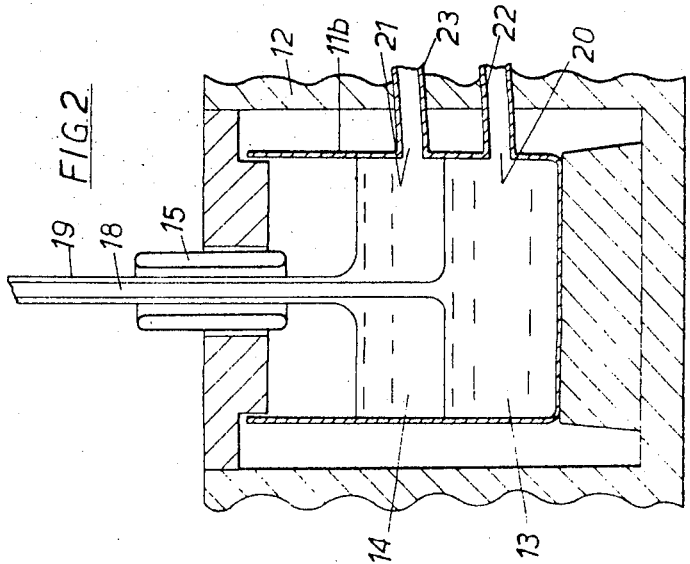
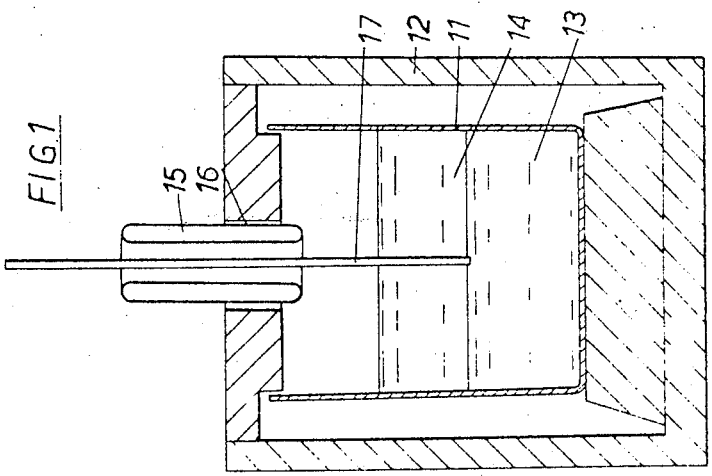
Alexander M. Reid
David W. Harper  Inventors
and Albert Forber
By Peter H. Smolka
Their Attorney

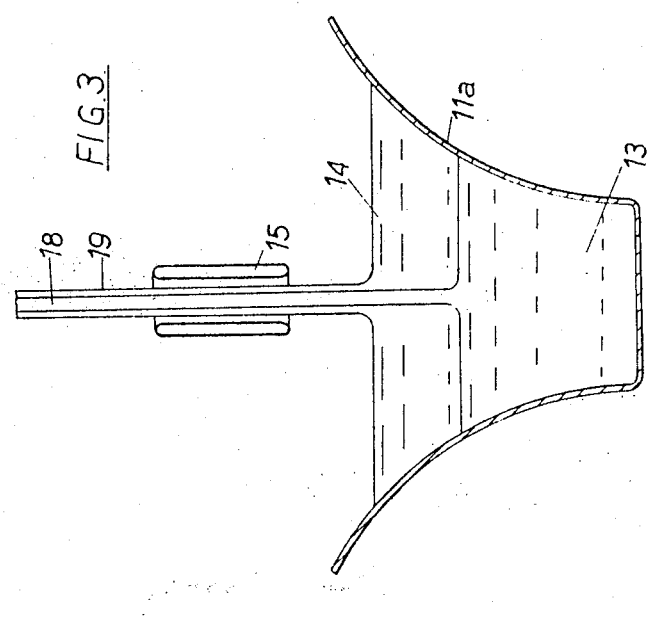

United States Patent Office 3,726,656
Patented Apr. 10, 1973

3,726,656
METHOD OF PRODUCING ELONGATED, CLAD GLASS MEMBER
Alexander Mailer Reid, St. Helens, David William Harper, Liverpool, and Albert Forber, Skelmersdale, England, assignors to Pilkington Brothers Limited, Liverpool, Lancashire, England
Filed Oct. 12, 1970, Ser. No. 79,761
Claims priority, application Great Britain, Oct. 14, 1969, 50,543/69
Int. Cl. C03b 15/14, 15/16
U.S. Cl. 65—3          2 Claims

ABSTRACT OF THE DISCLOSURE

A molten layer of cladding glass is supported on a molten layer of core glass and an elongated glass member comprising cladding on a core is drawn from the free surface of the upper layer of glass. The elongated member is cooled just above the free surface of the upper layer of molten glass. The elongated glass member may be drawn to form a clad fibre for use in fibre optics. Bait is lowered to the molten glass to initiate drawing of the elongated glass member.

BACKGROUND OF THE INVENTION

This invention relates to the manufacture of clad glass and more especially to the manufacture of a drawn elongated glass member clad with a second glass. For example the invention provides for the manufacture of a clad glass rod for subsequent redrawing into a clad fibre for use as an optical light guide or a clad fibre which is drawn directly and is also for use in fibre optics in which such fibres are employed to transmit information.

In the customary methods of making clad glass rod or clad fibres it has been found difficult to keep the interface between the core of the rod or fibre and the cladding glass free from contamination. Furthermore, in methods involving inserting a rod of core glass into a tube of cladding glass and then drawing a composite rod or fibre therefrom, it is difficult to achieve the required optical properties. It is an object of the present invention to produce clad glass rod or fibres in which contamination at the interface between the core and the cladding is minimal, and required optical properties are achieved.

SUMMARY OF THE INVENTION

The invention provides a method of producing an elongated clad glass member, comprising supporting a molten layer of a first glass on a molten layer of a second glass, drawing from the free surface of the upper layer an elongated member comprising an outer cladding of the first glass on a core of the second glass which is entrained at the interface between the layers, and stabilising the elongated member by cooling above the surface of the upper layer.

The beginning of the formation of the clad rod or fibre is thus at the interface between the two layers of glass. There is no deliberate glass flow at the interface of one glass over the other in order to achieve the cladding nor is contamination introduced into the interface such as would otherwise be drawn into the glass to glass interface of the clad member.

To start the entrainment at the interface the method may include lowering a bait to the molten glass and drawing the bait upwardly at a predetermined rate.

BRIEF DESCRIPTION OF THE DRAWINGS

FIG. 1 shows diagrammatically a straight walled pot, mounted in a furnace, containing two layers of molten glass into which bait has been lowered for drawing a clad glass rod;

FIG. 2 shows diagrammatically an alternative arrangement mounted in a furnace and arranged for continuous operation; and FIG. 3 shows a preferred alternative pot for use as shown in FIG. 1, shaped so that the depth of the upper layer of glass remains substantially constant.

DESCRIPTION OF THE PREFERRED EMBODIMENTS

FIG. 1 shows a pot or crucible 11 which is mounted in a suitable furnace 12 and contains two quiescent bodies of molten glass 13 and 14. A layer of molten glass 13 for constituting the core of a drawn member is established in the bottom of the crucible 11. This core glass 13 is in this embodiment a heavy glass of greater refractive index than the upper layer 14. Above this layer 13 there floats in the crucible a layer of a lighter glass of lower refractive index for cladding the core.

Examples of glasses which may be used as core glass 13 or cladding glass 14 are given in the following table, in which the proportions given are in weight percent.

| Oxides | Glass 1, core or cladding | Glass 2, core | Glass 3, cladding | Glass 4, cladding | Glass 5, cladding | Glass 6, core |
|---|---|---|---|---|---|---|
| $SiO_2$ | 69.96 | 15.48 | 63.41 | 66.05 | 56.45 | 45.03 |
| $PbO$ | | | | | 30.50 | 45.92 |
| $BaO$ | 1.99 | 18.63 | 10.91 | | | |
| $CaO$ | 9.50 | | | | | |
| $Na_2O$ | 10.46 | | 5.91 | 0.10 | 3.90 | 2.52 |
| $K_2O$ | 5.10 | | 10.65 | 7.60 | 8.40 | 6.29 |
| $LiO_2$ | | | | 0.80 | | |
| $B_2O_3$ | 0.57 | 10.64 | 6.94 | 18.80 | | |
| $Al_2O_3$ | 0.76 | | 1.98 | 5.10 | 0.50 | |
| $ZrO_2$ | | 7.50 | | 1.30 | | |
| $La_2O_3$ | | 23.17 | | | | |
| $Ta_2O_5$ | | 16.67 | | | | |
| $Nb_2O_5$ | | 4.90 | | | | |
| $TiO_2$ | | 3.01 | | | | |
| $MgO$ | | | | | | |
| $As_2O_3$ | 0.15 | | 0.10 | 0.25 | 0.20 | 0.20 |
| $Sb_2O_3$ | 0.50 | | 0.10 | | | 0.20 |

As indicated, glasses 2 and 6 are suitable as core glasses and glasses 3, 4 and 5 are suitable as cladding glasses. Glass 1 may be used as either core glass or cladding glass.

In FIG. 1 a cooler 15 of cylindrical form, such as a water jacket, is positioned in an aperture 16 in the top of the furnace above the crucible 11, the lower end of the cooler being above the top surface of the molten glass 14.

The apparatus shown in FIG. 1 is arranged for intermittent operation in that the drawing of a clad member must be repeatedly interrupted in order to replenish the supply of molten glass in the crucible 11.

In operation the lower layer of core glass 13 is first introduced into the crucible 11, and when this layer has settled in the crucible its surface is allowed to cool a little and form a "surface skin."

A bait in the form of a rod 17 is then lowered endwise by a winching apparatus (not shown), located above the furnace, into the lower layer so that the end of the bait just dips through the glass surface of the layer 13. The winching apparatus is positioned so that the bait is lowered axially through the cooler 15.

When the bait 17 is in its lowermost position the upper layer of cladding glass 14 is run into the crucible 11 without disturbing the quiescent lower layer 13 and there is a clean and sharply-defined glass-to-glass interface between the two layers.

The two glasses do not mingle at their glass-to-glass interface.

The furnace 12 in which the crucible is mounted is controlled so that both glasses 13 and 14 are at the same temperature although their viscosity at this temperature is not necessarily the same. In this example the glasses are in a thermally homogenous state with viscosities for example of $10^4$ to $10^5$ poises.

Fresh molten glass can be introduced into the layers either continuously (as described with reference to FIG. 2 below) or intermittently without disturbing the quiescent nature of the two contacting bodies or pools 13 and 14 of glass and without in any way disturbing the glass-to-glass interface at which drawing takes place.

When the upper layer 14 has settled down around the bait the winching apparatus is operated to draw the bait upwardly at controlled speed from the glass-to-glass interface. The bait draws with it a rod shaped member of the core glass of the lower layer, and as upward drawing continues and the end of the bait breaks the free surface of the upper layer of glass the drawn core 18 (shown in FIGS. 2 and 3) of the heavier glass carries with it a uniform cladding 19 of the lighter glass of the upper layer. The direct glass-to-glass interfaces in the crucible 11 can be maintained uncontaminated so that an uncontaminated optical surface is formed between the central core of the heavier glass and the cladding of the lighter glass, and the ultimate rod or fibre has excellent total internal reflection characteristics for piping light through the rod or fibre.

In this example a rod of core thickness of 2 to 2.5 mms. and cladding thickness of 0.5 mm. is drawn upwardly from the free surface of layer 14 at approximately 5 mms. per second, the viscosity of both glasses being in the range $10^{4.5}$ to $10^{5.5}$ poises. For some purposes however it may be arranged that the cladding 19 is only a few microns thick e.g. 10 microns. In order to achieve a uniform thickness of cladding glass on the drawn rod, it is important to maintain a constant depth for the upper layer of cladding glass 14. If a straight walled pot 11 is used as shown in FIG. 1, the depth of glass 14 will get less as the rod is progressively drawn. For this reason, it is preferred to use the specially shaped pot 11a shown in FIG. 3 in place of the straight walled pot shown in FIG. 1. In FIG. 3, the pot 11a is of circular cross section and the side walls curve uniformly inwards towards the bottom of the pot. The curved walls are so shaped that as the levels of the glass layers 13 and 14 fall due to removal of glass in the form of the drawn rod, the depth of the upper layer 14 remains constant. This is due to the reduced cross sectional area of the pot, as the level falls, compensating for the reduction in amount of glass 14 remaining in the pot. The pot 11a is used in a furnace 12 as previously described with reference to FIG. 1.

As well as the relative viscosities of the two glasses and the speed of upward drawing, other factors which control the overall diameter of the rod and the radial width of the cladding, are the distance of the bottom of the cooler from the free surface of the upper layer of glass, and the intensity of cooling. The bottom of the cooler is as near as possible to the free surface of the upper glass so that the clad glass rod or fibre which is drawn upwardly is quickly set.

Instead of using the specially shaped pot 11a shown in FIG. 3, the depth of the cladding glass 14 may be kept constant by continuous replenishment of the molten glass. Such an arrangement is shown in FIG. 2 in which a straight walled crucible 11b is provided with two inlets 20 and 21 passing through the wall of the crucible into the layers 13 and 14 respectively. Pipes 22 and 23 extend from the inlets 20 and 21 through the wall of the furnace 12 so that molten glass may be fed in at a controlled rate and at a required temperature to replenish both layers 13 and 14 continuously. Not only does this maintain the depth of layer 14 constant but it enables the clad rod to be drawn as a continuous process.

In all the above examples the clad member is drawn vertically upwards from the free surface of the lighter cladding glass. The point of draw may be stabilized by employing a die plate for example of platinum mounted near the upper surface of the glass 14 through which plate the bait is lowered and the ultimate rod is drawn. To achieve stabilisation, the die plate should either be in the upper glass layer 14 or only very slightly above its upper surface.

The drawn rod tends to be cylindrical in shape due to surface tension. This cylindrical shape may be confirmed or alternatively the shape of the rod can be varied by a shaped orifice in a die position above the uper surface of the layer 14. For example it is possible to draw a rod of square section. If a shaping die is used and is positioned above, but close enough to the upper surface of the layer 14, it may be used to stabilize the point of draw as well as to shape the rod.

The invention is not limited to the details described above. The winching apparatus may be replaced by continuous glass fibre drawing apparatus. Drawing wheels or diabolos may be used for continuously drawing a clad rod.

Initially a bait is employed to begin the drawing operation and thereafter a clad glass rod or fibre may be drawn upwardly continuously from the crucible or continuously fed drawing pot. This glass fibre can be used in the manufacture of a fibre optic.

Although in the description above, the bait 17 is initially lowered to the interface between the layers 13 and 14, it is not essential to do so. If the bait 17 is lowered only to the upper surface of the layer 14 and then raised, a rod will be drawn upwardly and the core glass 13 will eventually become entrained within the cladding glass 14 to produce the clad rod. In this case it is necessary to scrap the first few feet of the drawn rod as this will contain no core glass.

Clad glass rod can be drawn continuously by the method of the invention, or shorter lengths can be drawn by the intermittent process. Short lengths of the clad rod are reheated and drawn into fibre lengths if required.

Although the layers 13 and 14 are shown as distinct layers which do not mingle at the interface, it may be desirable in some cases, to achieve required optical properties, by using glasses which have a controlled amount of diffusion at the interface between two glasses so that in the finished rod or fibre there is no completely clear line of demarcation between the core and cladding.

The method of the invention thus provides for the production of high quality clad glass rods or fibres in which contamination of the interface between the core glass and the cladding glass is avoided. There is no deliberate glass flow at the interface of one glass over the other in order to achieve the cladding nor is contamination introduced into the interface such as would otherwise be drawn upwardly into the glass to glass interface of the rod or fibre.

The method of the invention may be employed for the manufacture of multi-clad fibres having for example three coatings formed by drawing of a rod or fibre upwardly from a triple layered glass system maintained in a drawing pot or crucible. The outer cladding may be for example an external light absorbent cladding.

The two layers of molten glass may be prevented from mixing with each other by operating with suitable viscosities for the two layers of glass.

A further alternative pot or crucible may be used, in place of the pot 11, which is shaped so that the ratio of the depths of the two glass layers remains constant as the rod is progressively drawn.

We claim:

1. A method of producing an elongated clad glass member, the method comprising:
   supporting, within the same container, a molten layer of a first glass on a molten layer of a second glass so as to establish two quiescent pools of glass one overlying the other within said same container;
   drawing from the free surface of the upper layer an elongated member comprising an outer cladding of the first glass on a core of the second glass which is entrained at the interface between the layers;

stabilizing the elongated member by cooling above the surface of the upper layer;

said elongated member drawn from the glass surface being of circular cross section; and regulating the speed of drawing to produce a clad glass rod.

2. A method of producing an elongated clad glass member, the method comprising:

supporting, within the same container, a molten layer of a first glass on a molten layer of a second glass so as to establish two quiescent pools of glass one overlying the other within said same container;

drawing from the free surface of the upper layer an elongated member comprising an outer cladding of the first glass on a core of the second glass which is entrained at the interface between the layers;

said elongated member drawn from the glass surface being of circular cross section; and regulating the speed of drawing to produce a clad glass fibre.

References Cited

UNITED STATES PATENTS

| | | | |
|---|---|---|---|
| 3,218,143 | 11/1965 | De La Jarte | 65—182 R |
| 2,683,676 | 7/1954 | Little et al. | 65—84 X |
| 2,992,517 | 7/1961 | Hicks, Jr. | 65—3 |

ARTHUR D. KELLOGG, Primary Examiner

U.S. Cl. X.R.

65—84, 188